(12) United States Patent
Kohring

(10) Patent No.: US 8,090,468 B2
(45) Date of Patent: Jan. 3, 2012

(54) MULTI-SPINDLE PHASE CONTROLLED MACHINING

(75) Inventor: Mark Douglas Kohring, West Chester, OH (US)

(73) Assignee: MAG IAS, LLC, Sterling Heights, MI (US)

( * ) Notice: Subject to any disclaimer, the term of this patent is extended or adjusted under 35 U.S.C. 154(b) by 721 days.

(21) Appl. No.: 12/205,102

(22) Filed: Sep. 5, 2008

(65) Prior Publication Data
US 2010/0063609 A1      Mar. 11, 2010

(51) Int. Cl.
    G06F 19/00 (2011.01)
(52) U.S. Cl. ........ 700/159; 700/169; 700/176; 700/178; 700/192; 700/193
(58) Field of Classification Search ............... 700/159, 700/169, 176, 178, 192, 193; 409/131, 141, 409/203, 213, 217
    See application file for complete search history.

(56) References Cited

U.S. PATENT DOCUMENTS

| | | |
|---|---|---|
| 1,723,999 A | 8/1929 | Bernard |
| 2,483,535 A | 10/1949 | Gallimore |
| 3,744,353 A | 7/1973 | Rohs |
| 3,823,644 A | 7/1974 | Mello |
| 3,945,694 A | 3/1976 | Vaillette |
| 3,946,298 A | 3/1976 | van de Loo |
| 4,047,469 A | 9/1977 | Sakata |
| 4,261,675 A | 4/1981 | Zankl |
| 4,535,527 A | 8/1985 | Fischer et al. |
| 4,611,934 A | 9/1986 | Piotrowski et al. |
| 4,640,158 A | 2/1987 | Link et al. |
| 4,979,121 A * | 12/1990 | Inoue et al. ............ 700/194 |
| 5,037,252 A | 8/1991 | Hasegawa et al. |
| 5,115,546 A | 5/1992 | Mitsukuchi et al. |
| 5,117,544 A | 6/1992 | Kousaku et al. |
| 5,193,953 A | 3/1993 | Jesinger |
| 5,221,185 A | 6/1993 | Pla et al. |
| 5,390,545 A | 2/1995 | Doan |
| 5,417,132 A | 5/1995 | Cox et al. |
| 5,663,894 A * | 9/1997 | Seth et al. ............ 702/56 |
| 5,713,253 A | 2/1998 | Date et al. |
| 5,784,273 A * | 7/1998 | Madhavan ............ 700/71 |
| 5,876,155 A | 3/1999 | Link et al. |
| 5,920,974 A | 7/1999 | Bullen |
| 6,135,682 A * | 10/2000 | McCalmont ............ 409/131 |
| 6,604,013 B1 * | 8/2003 | Hamidieh et al. ............ 700/175 |
| 6,618,646 B1 * | 9/2003 | Dyer ............ 700/279 |
| 2002/0138171 A1 * | 9/2002 | Fukutani ............ 700/188 |
| 2005/0246053 A1 * | 11/2005 | Endou et al. ............ 700/188 |
| 2006/0271231 A1 * | 11/2006 | Olgac ............ 700/159 |
| 2011/0088523 A1 * | 4/2011 | Yamada ............ 82/1.11 |
| 2011/0098843 A1 * | 4/2011 | Haas et al. ............ 700/169 |

\* cited by examiner

*Primary Examiner* — Ronald Hartman, Jr.
(74) *Attorney, Agent, or Firm* — Reising Ethington P.C.

(57) ABSTRACT

A method of controlling a multiple spindle machine includes measuring the motor currents provided to a first spindle and a second spindle over a period of time, establishing an amount of time between impacts on a workpiece of a cutting tooth of the first spindle relative to a cutting tooth of the second spindle based on the measured motor currents of the first spindle and the second spindle, determining an angle to shift the second spindle relative to the first spindle, and increasing or decreasing the amount of time between impacts to obtain the determined shift angle for the second spindle.

21 Claims, 5 Drawing Sheets

MULTI-SPINDLE PHASE CONTROLLED MACHINING

TECHNICAL FIELD

The present invention relates generally to multi-spindle machines and, more particularly, to controlling the phase of the spindles.

BACKGROUND OF THE INVENTION

Manufacturing industries use many types of machine tools for the production of precision parts. Machine tools include a wide range of vertical/horizontal machining centers and boring mills. The machine tools also include multiple-spindle machining centers that precisely machine or cut parts within a narrow margin of tolerance. Multiple-spindle machines often use a large gantry capable of supporting multiple spindle carriers that use electric motors to drive the spindles. Attached to the spindles are multi toothed cutters that shape the workpiece.

As each spindle turns and cuts a workpiece, tooth impacts from the individual cutter teeth on each spindle can create undesirable forces and torques that are added and subtracted to both the workpiece and the machine tool. If tooth impacts from each individual spindle become synchronized with tooth impacts from one or more of the other spindles, this can result in cutting variations of greater magnitude than intended. In some cases, the forces and torques cause chatter and excessive deflection of the cutter attached to the spindle. One method to reduce the chatter and excessive deflection calls for adjusting the position of the spindles so that the spindles are out of phase by an amount equal to 360 degrees divided by the product of the number of spindles and the number of cutting edges on each spindle. This method is described in U.S. Pat. No. 6,135,682 granted to Paul McCalmont. Previous systems implementing the methods described in the McCalmont patent have sensed the position of spindles using an external position sensor for each spindle, such as a high-precision rotary encoder. Rotary encoders, or any other position sensors, add cost to a machine. Additionally, spindles operate at high rotational speeds and as a result rotary encoders may require high sampling rates to accurately measure the position of a spindle. Such high sampling rates and high rotational speeds can require equipment that is costly and complex to implement.

SUMMARY OF THE INVENTION

According to an aspect of the invention, there is provided a first method of controlling a multiple spindle machine. The first method includes measuring the motor currents provided to a first spindle and a second spindle over a period of time, establishing an amount of time between impacts on a workpiece of a cutting tooth of the first spindle relative to a cutting tooth of the second spindle based on the measured motor currents of the first spindle and the second spindle, determining an angle to shift the second spindle relative to the first spindle, and increasing or decreasing the amount of time between impacts to obtain the determined shift angle for the second spindle.

According to another aspect of the invention, there is provided a second method of controlling a multiple spindle machine. The second method includes measuring the motor current of a first spindle over a defined period of time, measuring the motor current of a second spindle over the defined period of time, determining an amount of time elapsed between a first temporal point when the motor current of the second spindle equals a measured amount and a second temporal point when the motor current of the first spindle equals the measured amount, adjusting the angular position of the second spindle by increasing or decreasing the amount of time so that a cutting tooth of the first spindle is synchronized with a cutting tooth of a second spindle, calculating a desired shift angle between the first spindle and the second spindle, and shifting the position of a cutting tooth of the second spindle relative to a cutting tooth of the first spindle to minimize vibration, wherein the cutting tooth of the first spindle is positioned out of phase of the cutting tooth of the second spindle.

According to another aspect of the invention, there is provided a third method of controlling a multiple spindle machine. The third method includes determining a motor current sampling rate for measuring the motor current of a first spindle and a second spindle, where the sampling rate is variable and proportional to spindle speed, measuring the motor current for the first spindle over a period of time that the first spindle is engaged with a workpiece, measuring the motor current for the second spindle over a period of time that the second spindle is engaged with the workpiece, calculating a series of correlation values over the period of time using cross-correlation analysis, determining an elapsed time that corresponds to a correlation value nearest to a correlation value of one (1), and adjusting the impact of a cutting tooth of the second spindle relative the impact of a cutting tooth of the first spindle based on the elapsed time, wherein the cutting tooth of the first spindle is positioned out of phase of the cutting tooth of the second spindle.

According to another aspect of the invention, there is provided a fourth method of controlling a multiple spindle machine. The fourth method includes measuring the motor wattages provided to a first spindle and a second spindle over a period of time, establishing an amount of time between impacts on a workpiece of a cutting tooth of the first spindle relative to a cutting tooth of the second spindle based on the measured motor wattages of the first spindle and the second spindle, determining an angle to shift the second spindle relative to the first spindle, and increasing or decreasing the amount of time between impacts to obtain the determined shift angle for the second spindle to minimize vibration.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENTS

The method described below involves controlling a multiple spindle machine. The use of a multiple spindle machine can include the machining of workpieces using a plurality of spindles rotatably and simultaneously operated. But it has been noted that vibrations can occur during the use of multiple spindles. Vibrations can be reduced by phase-shifting or delaying individual spindles, and the cutting teeth linked to the spindles, relative to each other. A positional relationship between spindles capable of reducing the vibrations depends on the number of spindles and the number of cutting teeth per spindle. For example, using a three-spindle machine and three-tooth face mills, the positional relationship can be calculated by dividing the value 360 by the number of spindles and then dividing by the number of teeth on each mill. In this case, the calculation results in a 40 degree difference between the spindles (360/3/3=40). The first and second spindles can be positioned 40 degrees from each other and the third spindle can then be positioned 40 degrees from the second spindle (or 80 degrees from the first spindle). In another example, an eight-tooth cutter used on a five spindle machine would call for each of the eight spindles to be positioned 9 degrees from every other tooth (360/8/5=9). The first spindle can be positioned 9 degrees from each other, the first and third spindles can be positioned 18 degrees from each other, and so forth.

Generally speaking, the angular or phase position of any particular spindle, created by delaying individual spindles, can be determined by measuring or monitoring the current provided to the electric motor driving the spindle (or cutter). By measuring the current supplied to the motor over a period of time and noting the peaks and troughs of the supplied current it is possible to determine when a tooth on a spindle cutter impacts a workpiece. The higher measurements of current (or peaks) indicate those times when the cutting tooth is engaged with the workpiece. Alternatively, the lower measurements of currents (or troughs) indicate those times when the cutting tooth is disengaged with the workpiece.

Figure 1:
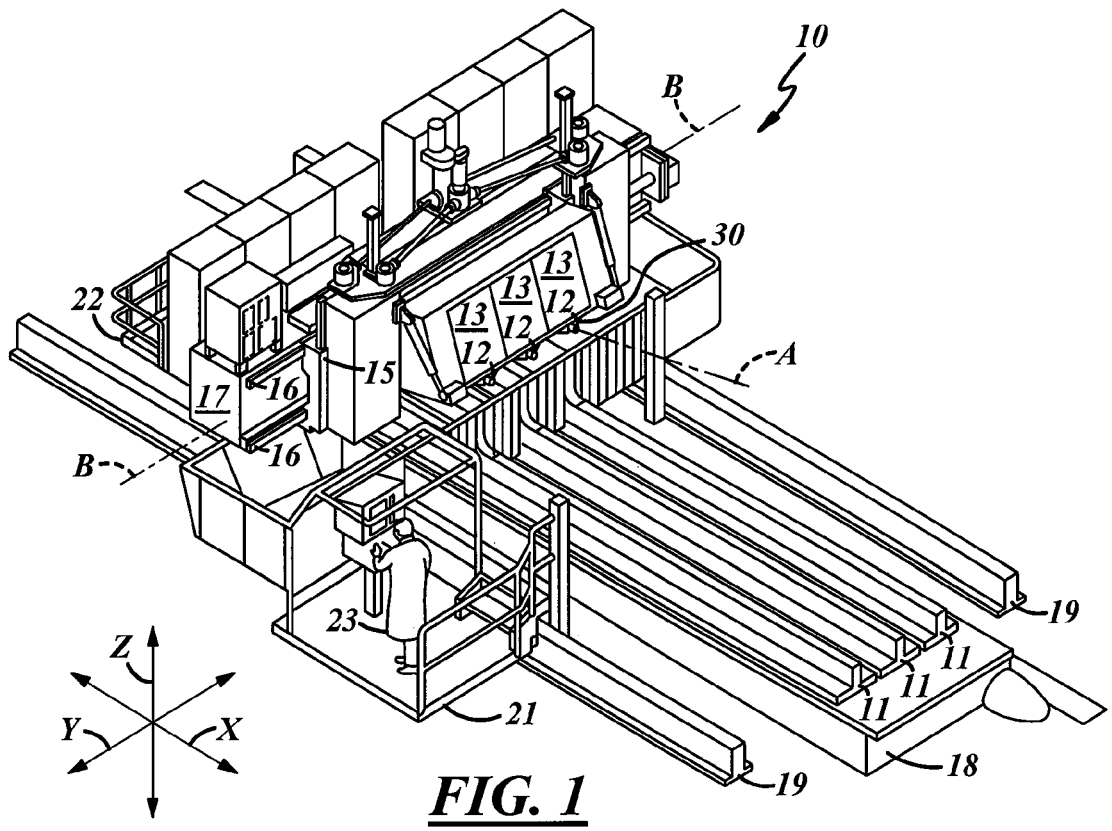
FIG. 1 is a rail-type five-axis gantry CNC vertical profiling machine.
Figure 2:
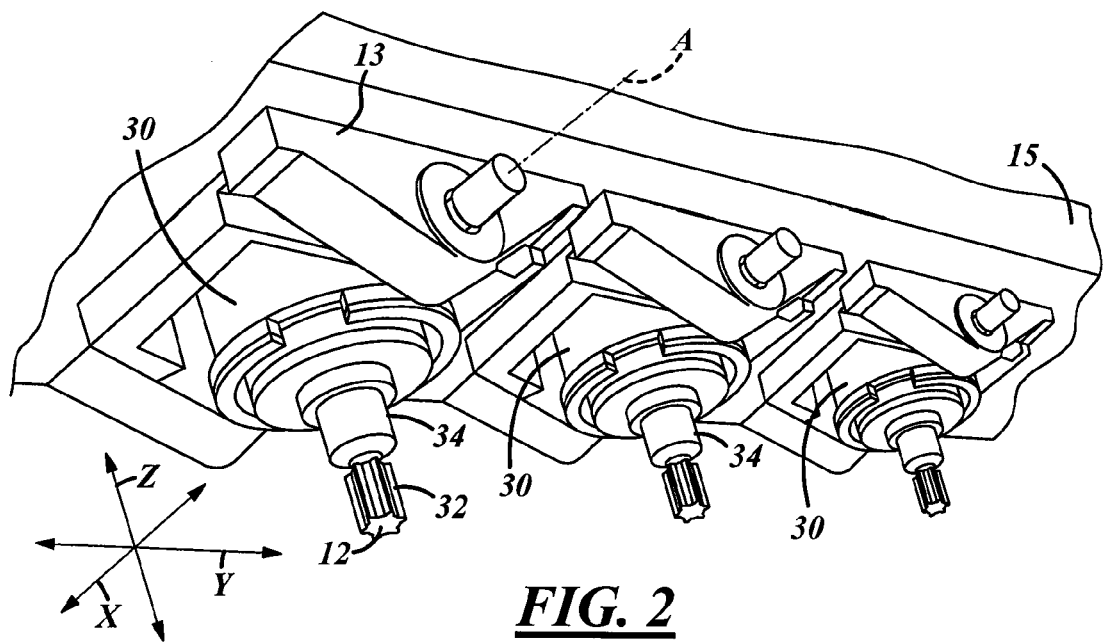
FIG. 2 is an enlarged perspective view of spindle carriers of the machine in FIG. 1.

FIGS. 1 and 2 illustrate an exemplary embodiment of a very large CNC machine 10 typically used. This machine is known as a rail-type five-axis gantry CNC vertical profiling machine, commercially manufactured by Cincinnati Machine LLC. The machine 10 is used to sculpt large workpieces 11 with cutters 12 held in three spindles 30 (shown in greater detail in FIG. 2) mounted on spindle carriers 13 moving under command of a computer control 14. The spindle carriers 13 are supported for vertical movement on a support which in an exemplary embodiment is a slide 15. The slide 15 moves transversely in relation to the bed on the ways 16 of a moveable bridge or gantry 17 to which it is moveably mounted. The gantry 17 moves horizontally along the length of the bed 18 on parallel rails 19 mounted to the floor 20. The gantry 17 on this particular type of machine 10 is quite large and includes forward and aft platforms, 21 and 22 respectfully, at the front and aft ends of the gantry for supporting an operator 23 and other service personnel (not shown). For all practical purposes, the machine bed 18, rails 19, and floor 20 may be considered as a common base, since they are relatively stationary with respect to one another.

As shown in FIG. 2, each spindle 30 includes a tool holder 34 adapted for receiving and retaining various cutting tools such as the cutters 12. Relative positioning between a workpiece and each spindle 30 is done along 3 linear motion axes X, Y, and Z and about two rotational axes, slide trunnion axis B (best shown in FIG. 1) about which the slide 15 moves in an X and Z plane, and spindle trunnion axis A about which each of the spindles 30 pivot and which is perpendicular to trunnion axis B. The gantry 17 moves horizontally along the length of the bed 18 which extends horizontally in a direction parallel to the X axis. The spindle carriers 13 move in a direction parallel to the Y axis as well as being capable to pivot about the trunnion axis B. Each of the spindles 30 is operably connected and in a driving relationship to a respective one of a like number of the cutters 12. Each of the cutters has a two or more cutting edges or teeth 32. The exemplary embodiment has three spindles 30 and three spindle carriers 13 where each cutter 12 has six cutter teeth 32. Each of the spindles 30 is operably connected to an electric motor (not shown) for rotatably driving each of the spindles.

Figure 3:
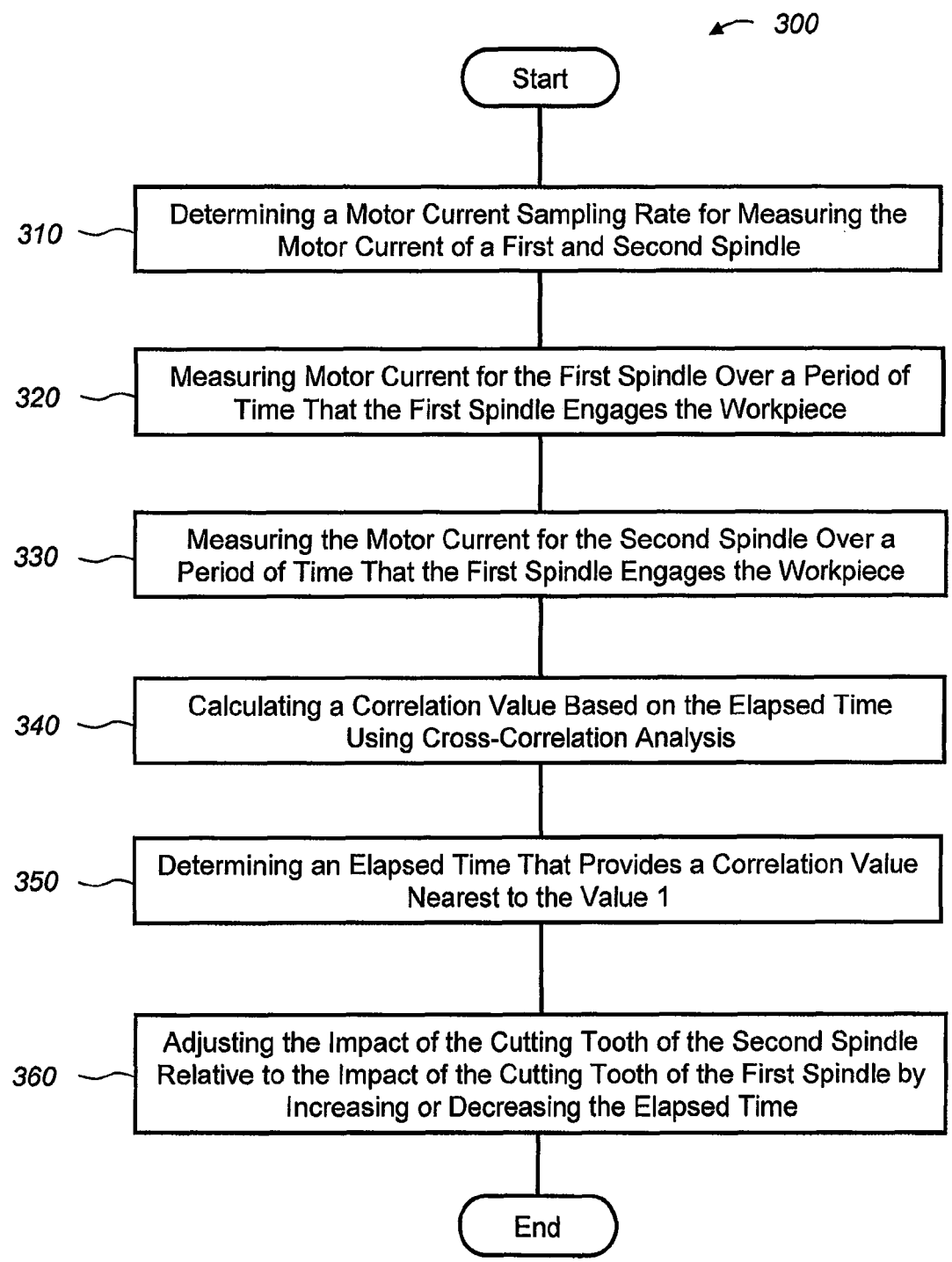
FIG. 3 is a block diagram illustrating one embodiment of a method of controlling a multi-spindle machine.

Turning now to FIG. 3, a block diagram shows an exemplary embodiment of the claimed invention. While the machine 10 described above involves three spindles, the method herein is described using two spindles. However, the method can be applied to a machine using any number of spindles because spindle position can be calculated relative to any other spindle position. For instance, in a 5 spindle machine the angular position of the second spindle can be calculated relative to the first spindle and then the position of the third spindle calculated relative to the second continuing until all 5 spindles are adjusted. Alternatively, spindles 2-5 can each be adjusted relative to the first spindle.

The method 300 begins at step 310. At step 310, a motor current sampling rate is determined for measuring the motor current of a first spindle and a second spindle, where the sampling rate is variable and proportional to spindle speed. Depending on the type of material of the workpiece, different spindle speeds are used to machine different materials. For instance, in order to obtain a sufficient amount of data representative of motor current, it is beneficial to establish sufficient frequency resolution for measuring motor feedback data. Sampling theory suggests that the sampling rate be at least twice the desired resolution. In one example, the face milling of steel involves a spindle speed of 400 revolutions per minute (RPM), a cutter diameter of 6 inches (in.), and 8 cutter teeth per cutter. This relationship results in a tooth impact frequency of 53.3 hertz (Hz) which translates into a tooth impact on the workpiece every 0.01875 seconds (sec.) and a practical surface speed limitation of 628 surface feet per minute (SFM). In this example of face milling, the period of tooth impacts is roughly 19 milliseconds (ms) which would benefit from a sampling rate period of approximately 9 ms. But an even finer resolution may be used when multiple spindles are used. For a 3-spindle machine, the sampling rate used to resolve tooth impacts to within ⅓ of tooth spacing (i.e. 15 degrees) may be approximately 3 ms. In another example, the end milling of titanium may involve a spindle speed of 250 RPM, a cutter diameter of 3 in., and 6 teeth per cutter. This relationship results in a tooth impact frequency of 25 Hz which translates into a tooth impact every 0.04 seconds and a practical surface speed limitation of 196 SFM. For a 3 in. diameter, 6 tooth end mill, the period of tooth impacts increases to around 40 ms. The minimum sampling rate used in this situation for the three spindle machine described above is approximately 6 ms. Alternatively, the sampling rate could be increased at a user's direction to produce a finer resolution as situations require. The method can then proceed to step 320.

Figure 4:
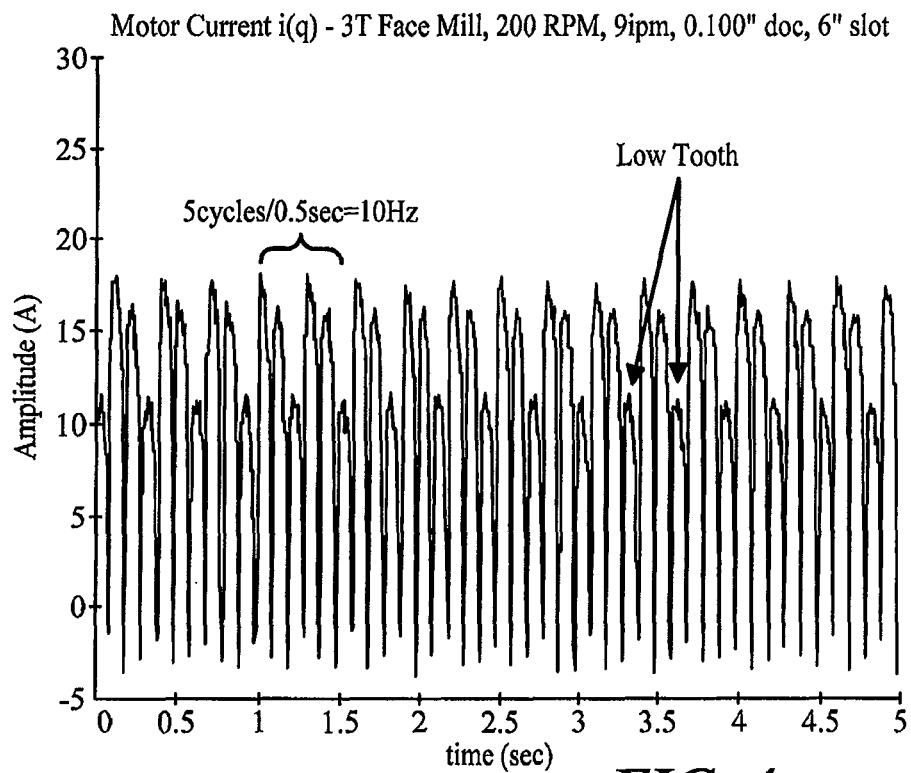
FIG. 4 is a graph indicating motor current of spindle motors.

At steps 320 and 330, the motor current for the first and second spindles are measured over a period of time that the first spindle and the second spindles are engaged with a workpiece. The motor current values may be measured by any suitable device known to those skilled in the art. One example of such device is the Startup Trace drive signal analysis software available on a Siemens Sinumarik 840D CNC control. The 840D drive signal analysis software can measure motor current, torque command, motor speed, and power. These variables can be obtained using an 840D servo trace data capture feature carried by the 840D drive analysis software. In addition, the motor current, torque command, motor speed, and other variables can be recorded using the 840D drive analysis software or any other suitable device for recording data. For example, FIGS. 4-6 and FIGS. 8A, 8B, and 9 illustrate data captured using the 840D drive analysis. FIG. 4 illustrates a typical measurement of torque-producing motor current i(q) captured using the 840D servo trace diagnostic tool on one spindle of a Cincinnati Machine LLC rail-type 3-spindle 5-axis profiler. The cut was performed using a 3 tooth 8 in diameter face mill in aluminum at 200 RPM, 9 inches per minute (ipm), 0.100 in. depth of cut (doc), and a 6 in. wide slot. The sampling rate for this particular data capture was equal to the system clock rate of 0.0025 sec. Another example of software for measuring the above data is produced by GE/Fanuc and provides a CNC control having an option called "Servo Guide" that can perform the above analysis.

As can be appreciated in FIG. 4, the frequency with which the cutter teeth impact the workpiece may be indicated by a high current reading created by each tooth impact. In this example, the cutter completes 5 cycles in 0.5 seconds resulting in 10 Hz. This calculation can be obtained by multiplying 200 RPM by three (the number of cutter teeth) and dividing that result by 60 (i.e. 200 RPM*3 spindles/60). FIG. 4 also illustrates two high current measurements followed by a lower current measurement. This relationship between the two high measurements indicates that the data is sensitive enough at the sampled resolution to show a difference in amplitude between successive tooth impacts due to the misalignment or variations of individual cutters that can cause vibration. In examples where the individual cutters are aligned, the data described in FIG. 4 may depict periodically occurring single high points and periodically occurring single low points.

Figure 5:
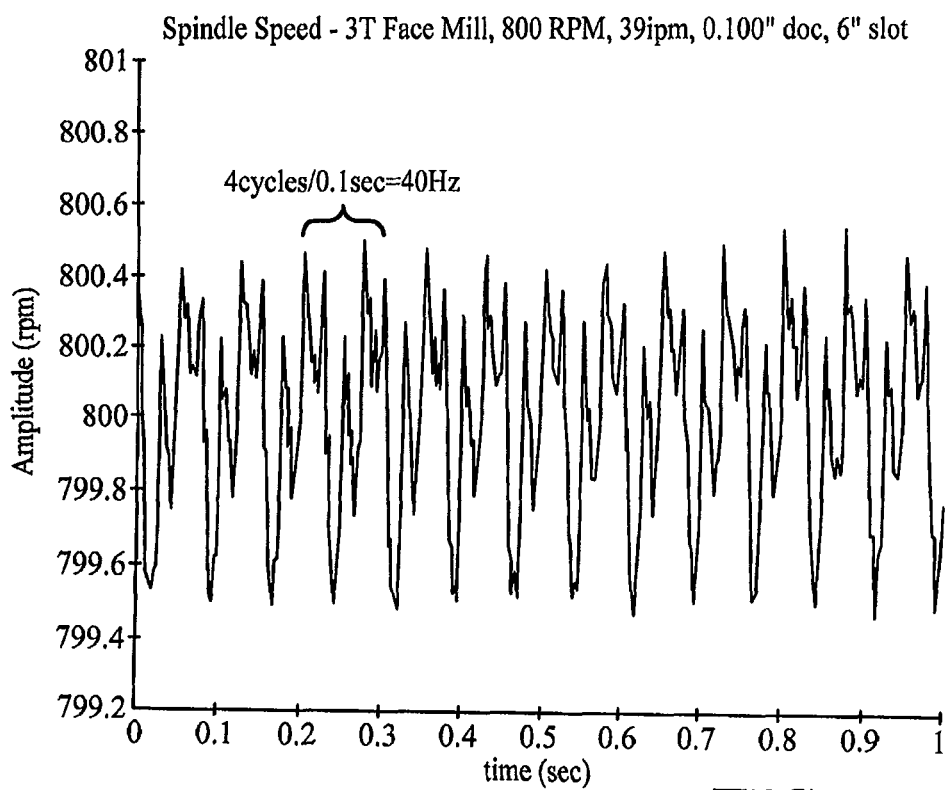
FIG. 5 is a graph indicating motor revolutions per minute of spindle cutting heads.
Figure 6:
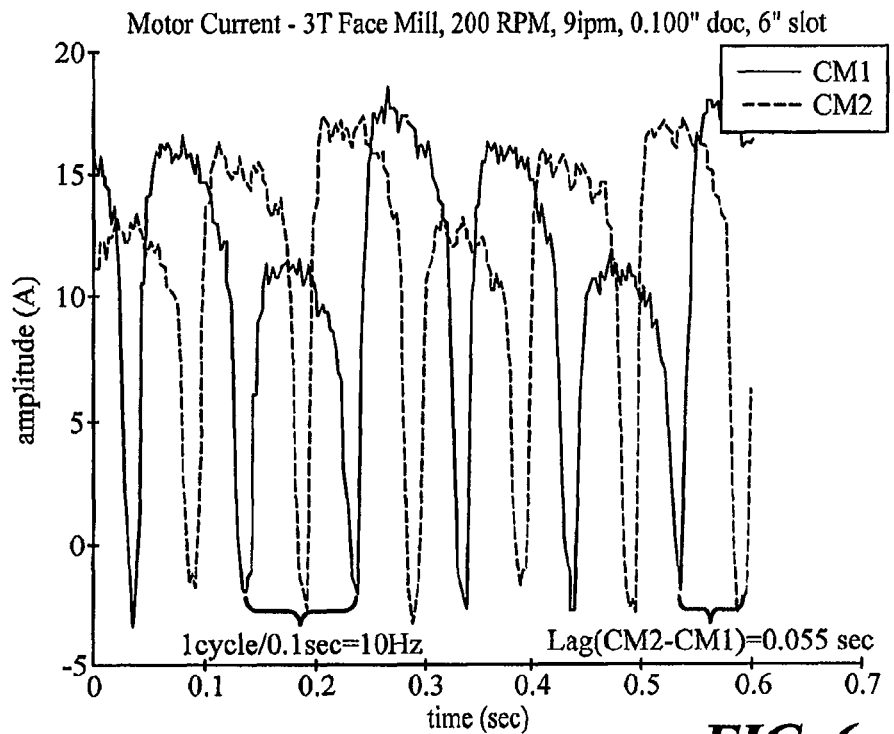
FIG. 6 is a graph indicating the measured current of a first spindle and a second spindle.

In another embodiment, the frequency of cutting tooth impacts can be determined by measuring the speed of the spindles rather than the current. FIG. 5 illustrates the spindle speed of one spindle of a Cincinnati Machine LLC rail-type 3-spindle 5-axis profiler. The cut was performed using a 3 tooth 8 in diameter face mill in aluminum at 800 RPM, 9 ipm, 0.100 in. doc, and a 6 in. wide slot. As with the data captured in FIG. 4, the misalignment of the individual cutters is indicated in the plurality of tooth impacts as it is shown in FIG. 5. The comparisons of FIGS. 4 and 5 can illustrate that the position of individual spindles can be determined not only from measuring the current supplied to the spindles but also from measuring spindle speed, such as revolutions per minute, for a period of time. While FIGS. 4 and 5 illustrate the motor current and spindle speed respectively for a single spindle, the same measurements can be conducted for a plurality of spindles. FIG. 6 illustrates an example where the current measurements of two spindles are depicted on the same graph. In this example, the position of each spindle at startup was random as may be the case when no spindle position synchronization occurs using a speed controller. In yet another embodiment, the frequency of cutting tooth impacts can be determined by measuring the power supplied to the motors driving the spindles rather than by measuring the current. The power supplied to the motors can be measured as a drive signal measurement. Much like detecting amperage amplitude variations when measuring current, it is possible to detect amplitude variations when measuring power (i.e. wattage). The method 300 can then proceed to step 340.

At step 340, returning to FIG. 3, a series of correlation values are calculated over the period of time using cross-correlation analysis. A cross correlation analysis can be used to calculate the similarity of two signals and can be a function of the relative time lag between them. For discrete real functions f(j) and g(j), the cross-correlation as a function of lag (or elapsed time) n can be defined as $C_n=\Sigma_j f(j)*g(n+j)$ where the sum is taken over a range of values of the integer j representing a sampling index and n is the discrete time lag for which the function is being evaluated. This function can then be normalized to yield a value between +1 and −1. Normalization can be done at every summation step by subtracting the mean and dividing by the standard deviation for each function.

The result of this particular example of normalization is commonly referred to as the Pearson product-moment correlation coefficient which can be described as $[P_n=1/(n-1)*\Sigma_j [f(j)-f_m]/s_f*[g(n+j)-g_m]/s_g]$ where $f_m$ and $g_m$ are the sample means and $s_f$ and $s_g$ are the standard deviations of the discrete real functions f(j) and g(j). Pearson's coefficient can indicate the degree of linear relationship between two variables ranging from +1 and −1. A correlation of +1 indicates a perfectly positive linear relationship between variables while a correlation of −1 indicates a perfectly negative linear relationship between variables. A correlation of 0 indicates that no linear relationship exists between the variables. For instance, over the period of time, such as the amount of time that passes during one complete spindle rotation, a varying number of correlation calculations can be completed, representing the series. The number of correlation calculations can be defined by the amount of time that passes between calculations, represented by delta t($\Delta$t) and the period of time. Delta t($\Delta$t) is a variable that can be defined by the user. The smaller the duration of $\Delta$t, the higher the resolution or number of the calculations over the period of time. The series of calculations can then represent a function over the period of time that the correlations calculations were calculated. Finding the correlation value nearest to one (1) can be accomplished by finding the maximum point of the function. The method 300 can then proceed to step 350.

Figure 7:
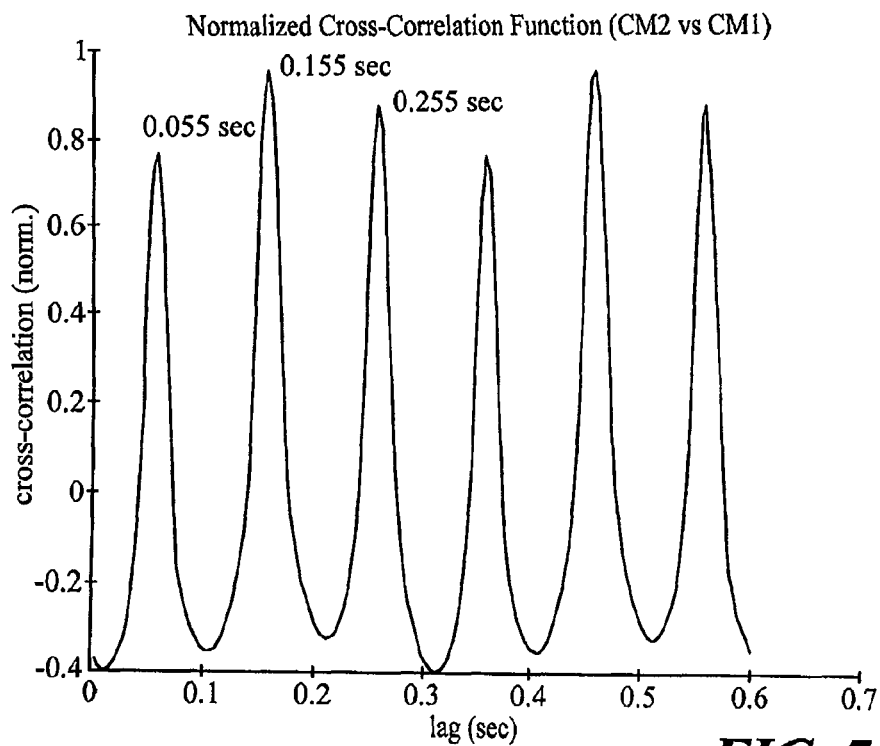
FIG. 7 is a graph indicating the normalized correlation between a first and second spindle.

At step 350, an elapsed time that provides a correlation value nearest to the value one (1) is determined. In one instance, this can be accomplished by relating the elapsed time or lag and the correlation value. For example, using the motor currents for the first spindle (CM1) and the second spindle (CM2) shown in FIG. 6, normalized cross-correlation coefficients or Pearson's coefficients were calculated over a period of time. The calculated coefficients are plotted in FIG. 7 in relation to elapsed time (or lag). From inspection, the 0.055 second elapsed time or lag for CM2 relative to CM1 identified in FIG. 6 corresponds to a ~0.76 correlation value and therefore indicates a high degree of correlation. But also from inspection, a 0.155 second elapsed time or lag has the highest degree of correlation (~0.96) and indicates that a more positive linear relationship exists at a lag or elapsed time of 0.155 seconds than the lag of 0.055 seconds. In this example, the pattern of high correlation coefficients repeats itself every 0.100 seconds and the period can be defined by the inverse of the tooth impact frequency of 10 Hz. In another embodiment, the elapsed time can be determined by counting the number of correlation values calculated before finding the highest degree of correlation and multiplying the number of calculations by (Δt).

In yet another embodiment, it is unnecessary to calculate the correlation values. An elapsed time between a current value recorded at the first spindle and the current value recorded at a second spindle may be determined. Or in other words, it is possible to determine the time elapsed between a first temporal point where the current supplied to the first spindle equals a predetermined value or predetermined measured amount and a second temporal point where the current supplied to the second spindle equals the predetermined value or the predetermined amount. This embodiment can also encompass determining the amount of time between cutter tooth impacts on the workpiece. For instance, the timing of FIG. 6 illustrates how the elapsed time may be measured. The variables CM1 and CM2 represent the first and second spindles and the current supplied to each spindle motor driving the first and second spindles. The elapsed time between two temporal points where the current supplied to the first spindle (CM1) is substantially the same as the current supplied to the second spindle (CM2) is shown. The elapsed time is indicated as Lag(CM2/CM1) and is calculated as 0.055 seconds. This measurement indicates that the tooth impact of spindle CM2 lags those of spindle CM1 by about 0.055 seconds or 66 degrees (i.e. (0.055)sec*(200/60)rev per sec*(360 deg per rev)) for this example. Or in other words, there is a 0.055 second time delay between the tooth impact of CM2 relative to CM1. The method can then proceed to step 360.

Figure 8A:
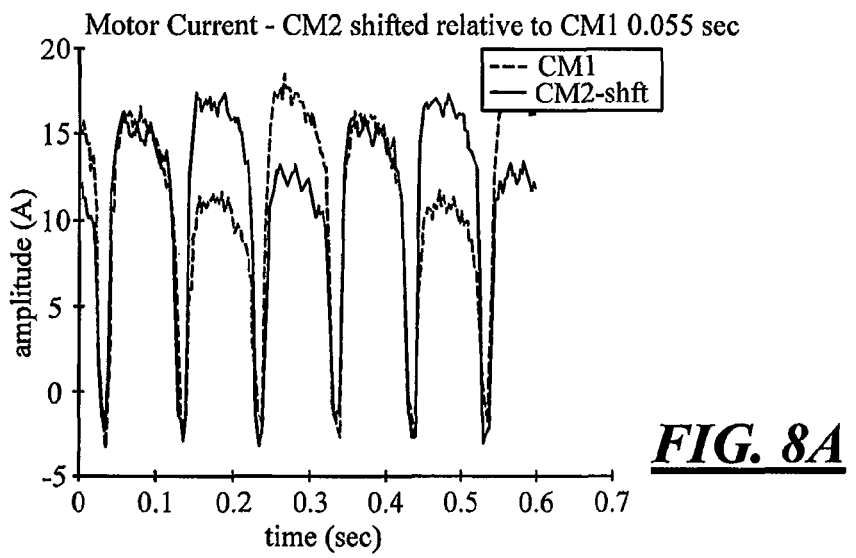
FIG. 8A is a graph indicating the measured motor current of spindle motors after the cutting head of the second spindle has been delayed by 0.055 seconds relative to the first.
Figure 8B:
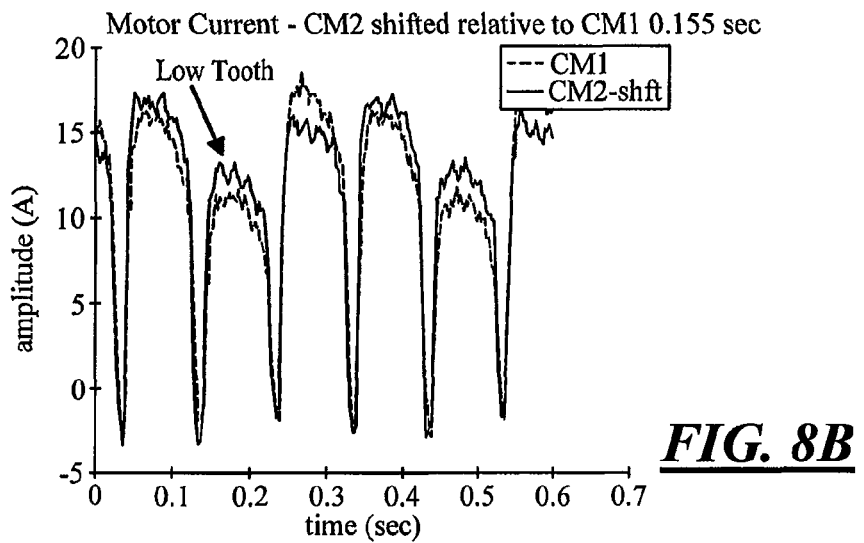
FIG. 8B is a graph indicating the measured motor current of spindle motors after the cutting head of the second spindle has been delayed by 0.155 seconds relative to the first.
Figure 9:
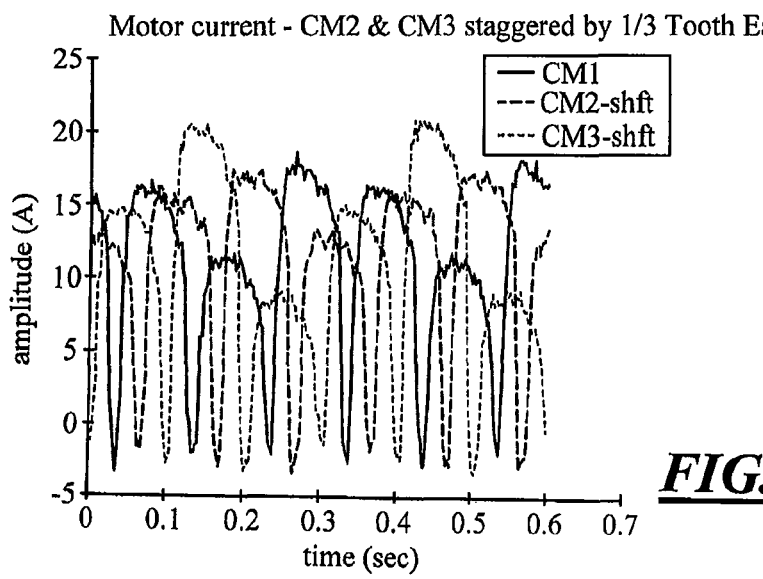
FIG. 9 is a graph indicating the measured motor current of three spindles after the second and third spindles have been delayed relative to the first spindle.

At step 360, the impact of the cutting tooth of the second spindle relative the impact of the cutting tooth of the first spindle is adjusted by increasing or decreasing the elapsed time. Increasing or decreasing the elapsed time, or lag, can involve changing the angular speed or phase position of individual spindles relative to other individual spindles. This can be accomplished in one of a multitude of ways. For instance the second spindle can be adjusted or phase-shifted relative to the first spindle so that the cutters, or cutter teeth are synchronized. The spindles then can be re-adjusted or phase-shifted a second time to desynchronize the cutters. In another example, the cutters or spindles can be desynchronized appropriately in one step. For instance, FIGS. 8A and 8B illustrate the motor current of CM2 and CM1 after phase shifting CM2 relative to CM1. FIG. 8A shows the measured motor current of CM1 and CM2 when CM2 is shifted 0.055 seconds and FIG. 8B shows the measured motor current of CM1 and CM2 when CM2 is shifted 0.155 seconds.

Phase shifting, changing the angular speed of the spindles, or inserting a time delay/lag can occur by delaying CM2 by a period of time. Phase shifting can be accomplished by various methods known in the art. One example of a device used to phase shift spindles or cutters is a Siemens 611D Spindle Drive. This device may also be used to maintain the phase shift once the cutters are in position using a speed controller. Phase shifting, changing the angular speed of the spindles, or the addition of time or lag can be implemented to create spindle positions equal to the tooth impact period divided by the number of spindles. This formula can be represented as follows where $D_s$ is the number of degrees between spindles or cutting teeth and is represented by the formula $D_s = s*60/\text{RPM}/N_{teeth}/N_{spindles}$ where s=1 to ($N_{spindles}-1$). FIGS. 8A and 8B illustrate shifting the phase of the spindles or cutters so that they are substantially synchronized. FIGS. 8A and 8B represent the additional lag of ⅓ tooth spacing or 0.0333 seconds to each spindle. After synchronizing the spindles, the formula indicated by $D_s$ can be used to determine the phase shift amount to desynchronize the spindles in order to reduce vibration. In addition to simply staggering the phasing of the cutting teeth, it is also possible to obtain an overall best fit by searching for the highest correlation coefficient over one complete period of spindle rotation (i.e. 60/RPM) and then adding an additional integer multiple of tooth impact periods to the fractional $D_s$ spacing in order to stagger relative to the lowest tooth of each spindle.

In another example, once the position of the spindles CM1 and CM2 can be determined from the motor current measurements or the spindle speed measurements as shown in FIGS. 4 and 5, a lag or time delay can be used to appropriately phase-shift spindles CM1 and CM2 into positions calculated based on $D_s$ or any other vibration reducing scheme. While the above examples have been described using only two spindles, a plurality of spindles can be phase-shifted or delayed using similar techniques.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A computer-implemented method of controlling a multiple spindle machine, comprising:
   (a) measuring the motor currents provided to a first spindle and a second spindle over a period of time;
   (b) establishing an amount of time between impacts on a workpiece of a cutting tooth of the first spindle relative to a cutting tooth of the second spindle based on the measured motor currents of the first spindle and the second spindle using computing resources;
   (c) calculating an angle to shift the second spindle relative to the first spindle based on the established amount of time between impacts using computing resources; and
   (d) increasing or decreasing the amount of time between impacts by controlling the position of the cutting tooth of the first spindle relative to the position of the cutting tooth of the second spindle based on computer control to obtain the calculated shift angle for the second spindle to minimize vibration.

2. The method of claim 1, wherein the motor current is recorded in a data capture for each spindle while engaged with the workpiece.

3. The method of claim 1, wherein the amount of time in step (d) is based on the formula $D_s=s*60/RPM/N_{teeth}/N_{spindles}$ where s=1 to $(N_{spindles}-1)$.

4. The method of claim 1, further comprising the step of: selecting a sampling period that is variable based on the speed of the first spindle and the second spindle.

5. The method of claim 1, further comprising the step of: calculating a correlation value based on the elapsed time using cross-correlation analysis.

6. The method of claim 1, wherein step (a) further comprises identifying unbalanced spindle cutters based on the measured motor currents.

7. The method of claim 1, wherein the time between impacts in step (b) further comprises measuring the speed of a spindle over the period of time.

8. A computer-implemented method of controlling a multiple spindle machine, comprising:
(a) measuring the motor current of a first spindle over a defined period of time;
(b) measuring the motor current of a second spindle over the defined period of time;
(c) determining an amount of time elapsed between a first temporal point when the motor current of the second spindle equals a measured amount and a second temporal point when the motor current of the first spindle equals the measured amount using computing resources;
(d) adjusting the angular position of the second spindle by increasing or decreasing the amount of time based on computer control so that a cutting tooth of the first spindle is synchronized with a cutting tooth of a second spindle;
(e) calculating a desired shift angle between the first spindle and the second spindle using computing resources; and
(f) shifting the position of a cutting tooth of the second spindle relative to a cutting tooth of the first spindle to minimize vibration based on computer control, wherein the cutting tooth of the first spindle is positioned out of phase with the cutting tooth of the second spindle.

9. The method of claim 8, wherein the motor current is recorded in a data capture for each spindle while engaged with the workpiece.

10. The method of claim 8, wherein shifting the position in step (f) further comprises using the formula $D_s=s*60/RPM/N_{teeth}/N_{spindles}$ where s=1 to $(N_{spindles}-1)$.

11. The method of claim 8, further comprising the step of: selecting a sampling period that is variable based on the speed of the first spindle and the second spindle.

12. The method of claim 8, further comprising the step of: calculating a correlation value based on the elapsed time using cross-correlation analysis.

13. The method of claim 8, further comprising identifying unbalanced spindle cutters based on the measured motor currents.

14. The method of claim 8, wherein the time between impacts in step (b) further comprises measuring the speed of a spindle over the period of time.

15. A computer-implemented method of controlling a multiple spindle machine, comprising:
(a) determining a motor current sampling rate for measuring the motor current of a first spindle and a second spindle, wherein the sampling rate is variable and proportional to spindle speed;
(b) measuring the motor current for the first spindle over a period of time that the first spindle is engaged with a workpiece;
(c) measuring the motor current for the second spindle over a period of time that the second spindle is engaged with the workpiece;
(d) calculating, using computing resources, a series of correlation values over the period of time using cross-correlation analysis;
(e) determining an elapsed time that corresponds to a correlation value nearest to a correlation value of one (1) using computing resources; and
(f) adjusting the impact of the cutting tooth of the second spindle relative the impact of the cutting tooth of the first spindle by increasing or decreasing the elapsed time to minimize vibration, wherein the cutting tooth of the first spindle is positioned out of phase of the cutting tooth of the second spindle based on computer control.

16. The method of claim 15, wherein the motor current is recorded in a data capture for each spindle while engaged with the workpiece.

17. The method of claim 15, wherein adjusting the impact in step (f) further comprises using the formula $D_s=s*60/RPM/N_{teeth}/N_{spindles}$ where s=1 to $(N_{spindles}-1)$.

18. The method of claim 15, further comprising measuring the speed of a spindle over the period of time.

19. The method of claim 15, wherein the number of correlation values in the series is determined by a delta t ($\Delta t$) that represents an amount of time that passes before each correlation value is calculated.

20. The method of claim 19, wherein the elapsed time in step (e) is calculated by multiplying the number of correlation values measured at the correlation value closest to one by the delta t ($\Delta t$).

21. A computer-implemented method of controlling a multiple spindle machine, comprising:
(a) measuring the speed of a first spindle and a second spindle over a period of time;
(b) establishing an amount of time between impacts on a workpiece of a cutting tooth of the first spindle relative to a cutting tooth of the second spindle based on the measured speed of the first spindle and the second spindle using computing resources;
(c) calculating an angle to shift the second spindle relative to the first spindle based on the established amount of time between impacts using computing resources; and
(d) increasing or decreasing the amount of time between impacts by controlling the position of the cutting tooth of the first spindle relative to the position of the cutting tooth of the second spindle based on computer control to obtain the calculated shift angle for the second spindle to minimize vibration.

* * * * *